R. B. HARTSOUGH.
ADJUSTABLE BEARING.
APPLICATION FILED DEC. 15, 1910.
1,009,244.
Patented Nov. 21, 1911.
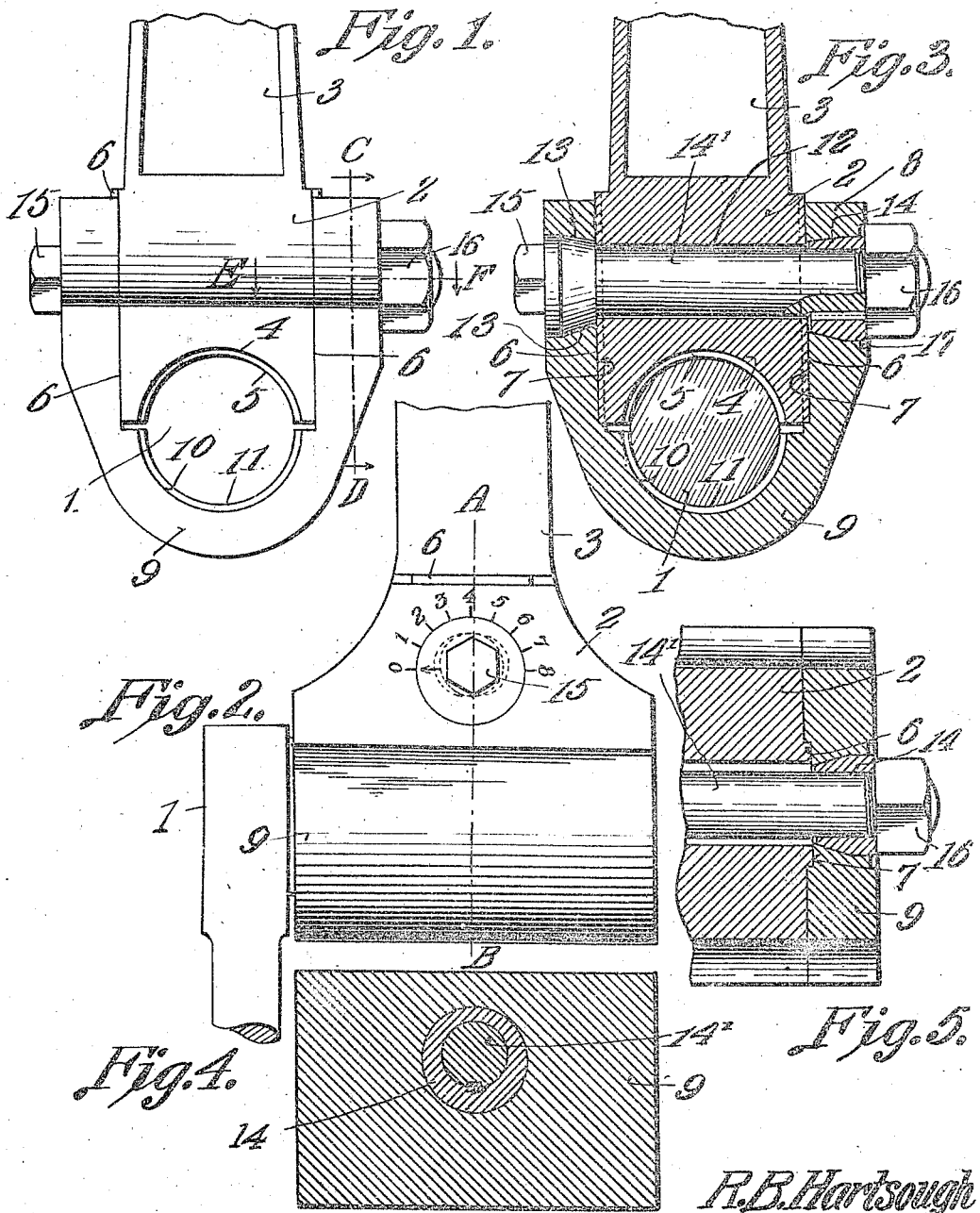
Witnesses
Inventor
R. B. Hartsough
by
Attorneys

UNITED STATES PATENT OFFICE.

RALPH B. HARTSOUGH, OF MINNEAPOLIS, MINNESOTA.

ADJUSTABLE BEARING.

1,009,244.

Specification of Letters Patent. Patented Nov. 21, 1911.

Application filed December 15, 1910. Serial No. 597,508.

*To all whom it may concern:*

Be it known that I, RALPH B. HARTSOUGH, a citizen of the United States, residing at Minneapolis, in the county of Hennepin and State of Minnesota, have invented a new and useful Adjustable Bearing, of which the following is a specification.

This invention relates to adjustable bearings and is more particularly designed as a means for coupling the connecting rods of hydrocarbon engines and the like to crank shafts.

The invention has for one of its objects the provision of an improved means for adjusting the bearing to take up wear upon the parts, such adjustment being effected quickly and accurately and the parts of the device being so constructed and arranged as to positively hold without danger of the bearing working loose.

A further object is to provide a bearing of this type which is compact and durable in construction and the parts of which can be readily assembled.

A still further object is to provide a bearing which dispenses with the use of shims and which prevents uneven tightening and consequent binding of the parts.

A further object is to provide a bearing the parts of which can be quickly adjusted without requiring the services of a mechanic.

With the foregoing and other objects in view which will appear as the description proceeds, the invention resides in the combination and arrangement of parts and in the details of construction hereinafter described and claimed, it being understood that changes in the precise embodiment of invention herein disclosed can be made within the scope of what is claimed without departing from the spirit of the invention.

In the accompanying drawings the preferred form of the invention has been shown.

In said drawings:—Figure 1 is an elevation of a bearing constructed in accordance with the present invention, the same being shown at one end of a connecting rod. Fig. 2 is a plan view of the bearing and the adjoining portion of the connecting rod on which it is arranged. Fig. 3 is a section on line A—B Fig. 2, a crank being shown in section within the bearing. Fig. 4 is a section on line C—D Fig. 1. Fig. 5 is a section on line E—F Fig. 1.

Referring to the figures by characters of reference 1 designates a portion of crank, the same being engaged by the fixed member 2 of the bearing, this member, in the present instance, being shown integral with one end portion of a connecting rod 3. The member 2 has a concaved working face such as indicated at 4 and on which is arranged a wear plate 5.

Broad guide ribs 6 are formed upon opposed faces of the member 2 and are fitted within grooves 7 extending longitudinally within the inner faces of arms 8. These arms are integral with the adjustable member 9 of the bearing, said member being formed with a concave working face 10 provided with a bearing plate 11. The inner or grooved faces of the arms 8 extend along parallel lines.

An opening 12 extends through the member 2 and is preferably oval in transverse contour, the short axis of the opening being extended in the direction of the length of the rod 3. Openings 13 are formed in the arms 8 and taper inwardly, each opening 13 forming a seat for a tapered eccentric 14. The two eccentrics are feathered on the end portions of a bolt 14' extending through the opening 12 and through the openings in the arms 8, there being a head 15 at one end of the bolt while an adjusting nut 16 engages the other or threaded end of the bolt. One of the arms 8 may be counter-bored as indicated at 17 so as to render possible a greater adjustment of the nut relative to the bolt. Either or both of the eccentrics 14 has an arrow or other indicating mark thereon which, when the eccentric is rotated, is brought into register with any one of a series of graduations on the arm 8 and which are arranged partly around the opening in which the eccentric is located, these graduations being suitably designated as indicated, for example in Fig. 2.

When it is desired to assemble the parts of the bearing, one of the eccentrics 14 is placed upon bolt 14' and moves against the head 15. After the crank has been seated within the concaved end of the bearing member 2, the cap 9 is placed astride the crank and the arms 8 are slid along the guide ribs 6 until the openings 13 are brought to register with the opening 12. Bolt 14' is then inserted through the openings and the second eccentric 14 is placed on the threaded end of the bolt and nut 16 is tightened. By applying a wrench or other suitable tool to the head 15 the bolt 14' can be rotated so as to shift the eccentrics therewith. As these eccentrics rotate within the openings 13, they cause the arms 8 to shift longitudinally so as to move the cap 9 toward or away from the member 2, as may be desired. After the proper adjustment has been effected, the eccentrics can be clamped tightly upon their seats by means of the nut 16 and there will thus be no danger of the parts working loose.

The amount of adjustment which has been and which may be had will always be accurately indicated by the graduations on the member 2 and the mark coöperating therewith and which is carried by the adjacent eccentric 14.

What is claimed is:—

1. A bearing including separately movable members, one of said members straddling the other member, eccentric mechanism for shifting the members relative to each other, said mechanism including a connecting bolt extending through both of the members, tapered eccentrics revoluble with the bolt, means for simultaneously rotating the eccentrics about a common axis, and means for shifting the eccentrics toward each other to bind them upon one of the members and hold the eccentrics and the bolt against rotation.

2. A bearing including movably connected members oppositely disposed, one of said members straddling the other member, a connecting bolt extending through the members, tapered eccentrics revoluble with the bolt and each of said eccentrics being circular in cross section and revoluble within one of the members, and means engaging the bolt for shifting the eccentrics toward each other to bind them upon seats within one of the members.

In testimony that I claim the foregoing as my own, I have hereto affixed my signature in the presence of two witnesses.

RALPH B. HARTSOUGH.

Witnesses:
A. G. TRAEGER,
R. A. MABEY.